No. 789,654. PATENTED MAY 9, 1905.
E. E. COOK.
RADIAL TRUCK.
APPLICATION FILED NOV. 8, 1904.
3 SHEETS—SHEET 1.
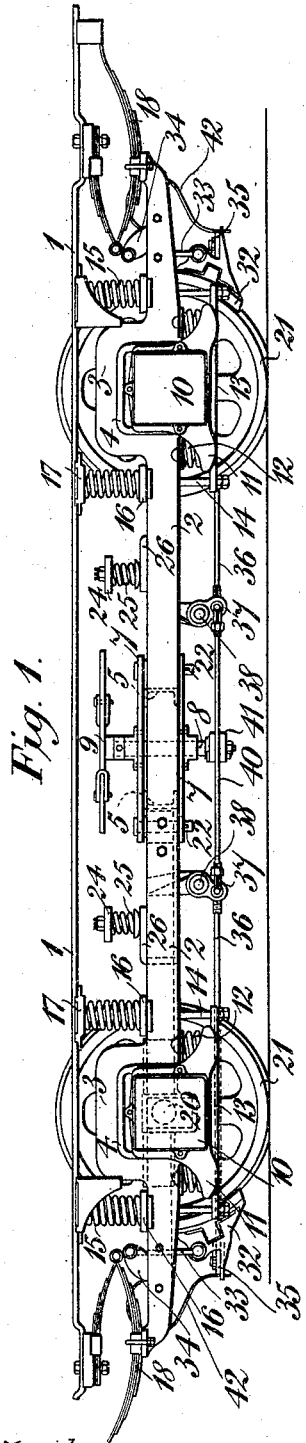
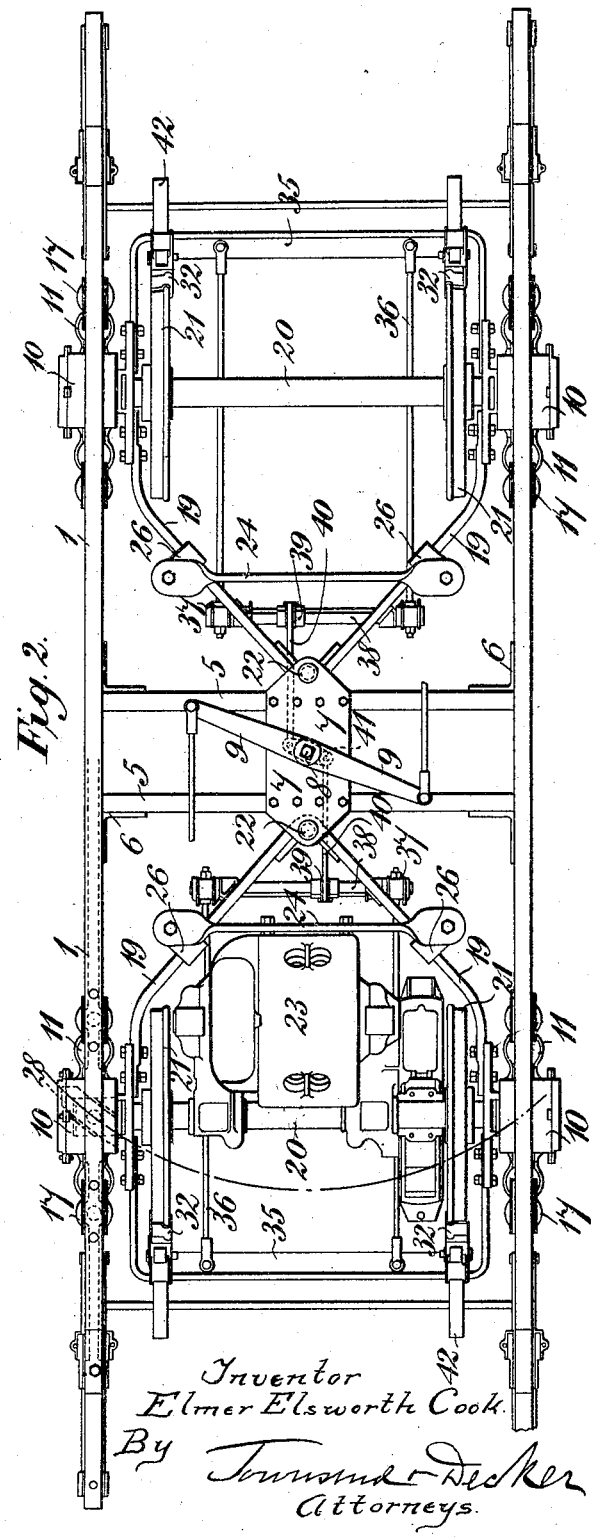
Witnesses
C. F. Tischner
A. Frankenthal
Inventor
Elmer Elsworth Cook
By Townsend & Decker
Attorneys.

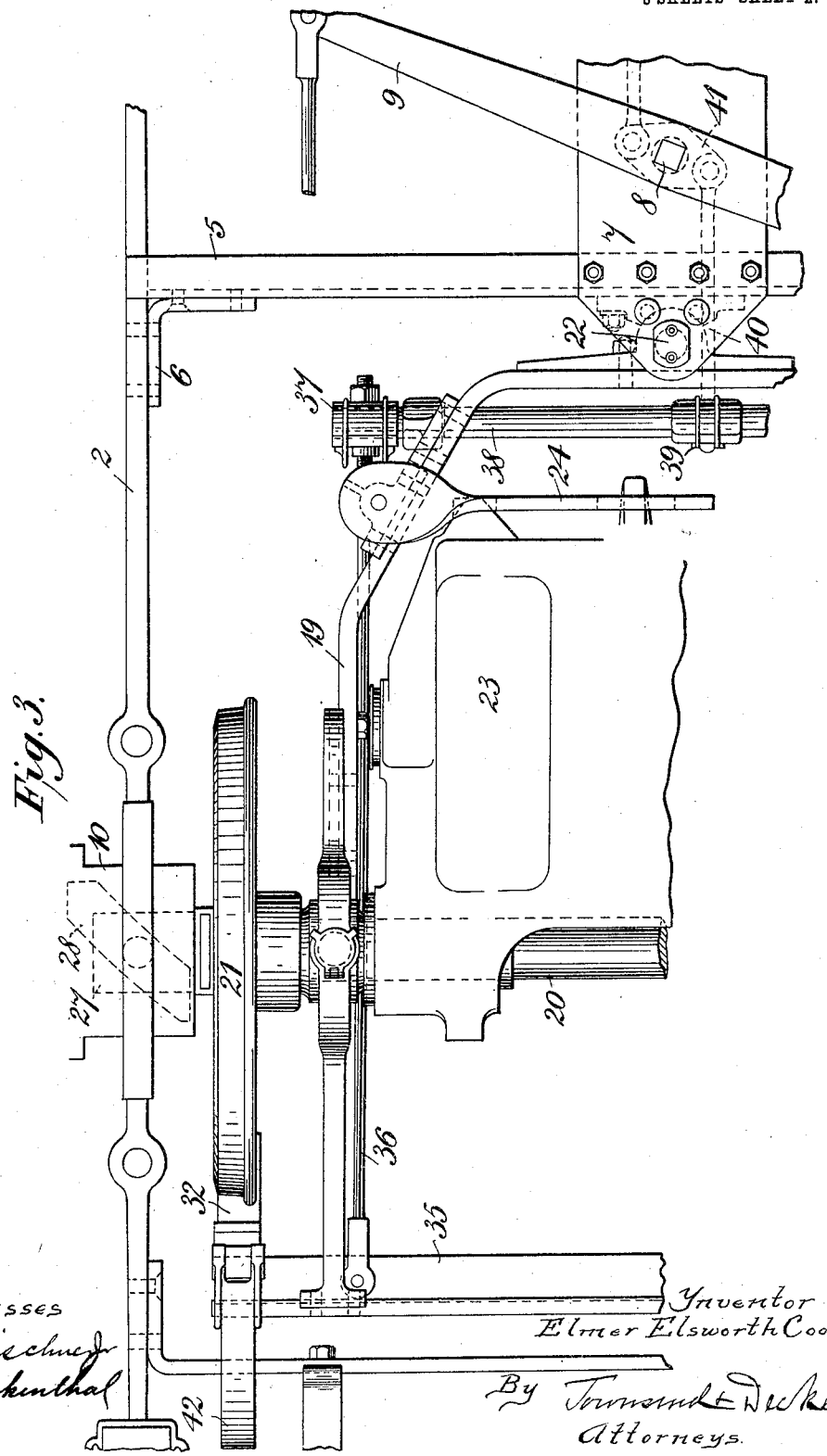

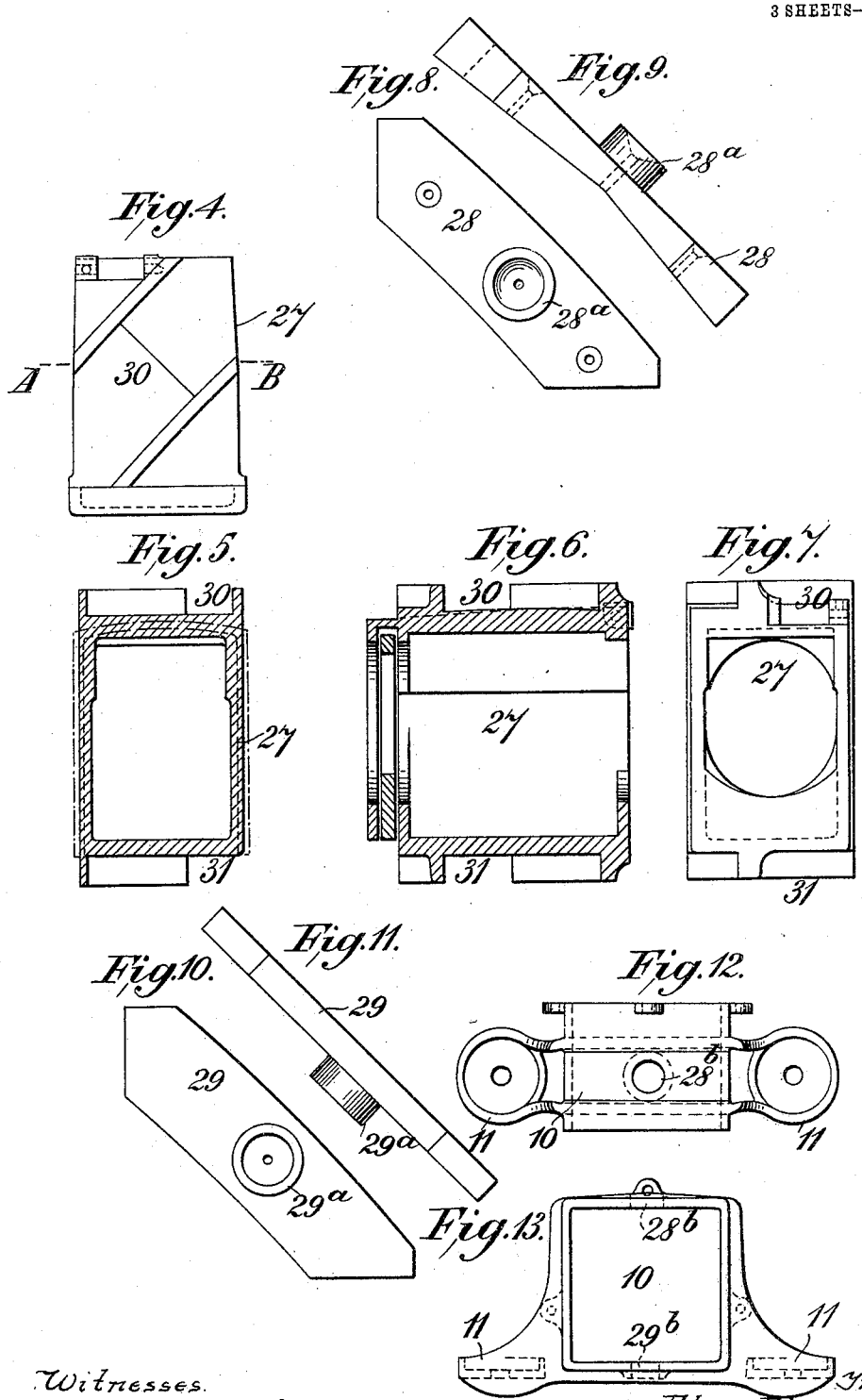

No. 789,654.                                                                                   Patented May 9, 1905.

UNITED STATES PATENT OFFICE.

ELMER ELSWORTH COOK, OF LOUGHBOROUGH, ENGLAND.

RADIAL TRUCK.

SPECIFICATION forming part of Letters Patent No. 789,654, dated May 9, 1905.

Application filed November 8, 1904. Serial No. 231,848.

*To all whom it may concern:*

Be it known that I, ELMER ELSWORTH COOK, a citizen of the United States of America, residing at Loughborough, in the county of Leicester, England, have invented Improvements in Radial Trucks, of which the following is a specification.

This invention has reference to trucks for tramway and like vehicles, and is applicable to such as run on four wheels and have a relatively long wheel-base and whose axles have a movement radial to the track or curve.

The invention has for its object to provide an improved form of construction of such trucks and also to provide means whereby the brake-gear is simplified and the brake-blocks caused to be always in a position to engage the wheels without the provision of compensating gear.

In a truck constructed in accordance with this invention each axle is mounted in a frame that is pivoted at its inner end to the truck at a point between the axle and the central portion of the truck. Each frame is provided with an electric motor, and on the frame the brake-gear is also carried and so arranged that the brake-blocks always come into proper contact with the wheels when the gear is operated, even when the vehicle is rounding a curve or is entering or leaving a turnout.

Referring now to the accompanying drawings, Figures 1 and 2 are respectively a side elevation and a plan of a truck constructed in accordance with this invention. Fig. 3 is a partial plan view of a modified construction of truck. Figs. 4, 5, 6, and 7 are respectively a plan, a section on the line A B of Fig. 4, a longitudinal section, and a front elevation of the inner axle-box. Figs. 8 and 9 are a plan and a side view, respectively, of the top guides. Figs. 10 and 11 are similar views to Figs. 8 and 9 of the bottom guides; and Figs. 12 and 13 are a plan and side elevation, respectively, of the outer axle-box.

As is obvious, the figures are not drawn to the same scale.

In the two constructions shown in Figs. 1 and 2 and in Fig. 3 the truck comprises two upper longitudinal side members 1, upon which the sill of the car-body rests, and two lower longitudinal side members 2. Each of the lower side members 2 is formed toward each end thereof with a yoke 3, having axle-box guides 4. The two lower longitudinal side members 2 are connected together at or near the central portion of their length by two transversely-arranged members 5. These transversely-arranged members 5 comprise beams of channel section connected to the side members 2 by angle-irons 6 and spaced at a suitable distance apart. Secured to the upper and lower sides of the transversely-arranged members 5 and about midway of their length are plates 7. In each of these plates and midway between the transversely-arranged members 5 is formed a bearing for a vertically-arranged shaft 8, whose upper end is secured to the equalizing-bar 9 of the brake-gear.

The end of each axle 20 is mounted in a compound axle-box, hereinafter to be described. Each axle-box 10 has extending outwardly and longitudinally of the vehicle from two opposite sides thereof a spring-holder 11. The spring-holders are near to or, as shown, may extend below the lowest portion of the axle-box proper. Between each spring-holder 11 and a correspondingly-arranged spring-holder mounted on the under side of the lower side member 2 is placed a coiled bearing-spring 12. Extending below each axle-box 10 and its spring-holders 11 and longitudinally of the vehicle is a bar or carrier 13, that is suspended from the upper side member 1 by a pair of rods 14. These rods 14 are surrounded at that portion of their length which is between the lower face of the upper side member 1 and the upper face of the lower side member 2 by coiled springs 15, that are seated in spring-holders 16 and 17, secured to the upper and lower faces of the lower and upper side members 2 and 1, respectively. The ends of the upper side members 1 that overhang the ends of the lower side members 2 are supported by laminated plate-springs 18, carried by the lower side members 2.

19 represents the frames mounted on the axles 20 and which partly carry the electric motors and are pivoted at a point between the axles 20 and the central portion of the truck. Each of the frames is mounted at one part on an axle 20, the frame being so arranged that its bearings come either between the wheels 21, as shown in Fig. 3, or outside of the wheels, as shown in Figs. 1 and 2.

The inner side of each frame 19 extends inwardly toward the central portion of the truck and is pivoted thereto at a point between the axle 20 and the central portion of the truck. In the arrangements now being described each frame 19 is shown pivoted on a pin 22 between the plates 7, carried by the transversely-arranged members 5. The plates 7 extend at each end beyond the transversely-arranged members 5 toward the outer ends of the vehicle to enable this pivotal connection to be made. 23 is the electric motor that is mounted, as usual, at one side on the axle 20. The other side of the motor is supported by and connected to a transversely-arranged bar 24, that is mounted at each end on coiled springs 25, carried by lugs 26, secured to the frame 19.

Each of the axles 20 is journaled in such wise that the axle can radiate when the car is entering or leaving a curve or turnout, the center of radiation being the pivotal point—i. e., the pin 22 of the frame 19. This movement of the axle radial to the curve is permitted by mounting each end of the axle in a compound journal box or bearing that comprises an outer box 10 and an inner box 27, Figs. 4 to 13. The outer box is capable of a vertical movement in the guides 4 and forms a carrier for the inner box 27, in which the axle 20 rotates. This inner box moves vertically with the outer box, but is also capable of a movement separated therefrom—i. e., a lateral and sliding movement therein. To permit of this latter movement, the outer box is made considerably wider than the inner box and is provided with curved guides 28 29 at the top and bottom, respectively. These guides are in the form of ribs and engage with correspondingly-formed grooves 30 31 in the top and bottom of the inner box, respectively. The guides 28 29 are not made in one with the outer box, but each is provided with a boss 28$^a$ 29$^a$ on its back, which is adapted to enter a hole 28$^b$ 29$^b$, formed in the top and bottom walls of the outer box, so that the guides can swivel, if necessary. The top guide 28 is made to slope slightly from its outer ends toward its center, as shown in Fig. 9. The grooves 30 31 in the inner box are formed by walls that extend upwardly and downwardly from the upper and lower external faces of the box and are curved to correspond with the curvature of the guides 28 29. The groove 30 in the top of the box is made to curve slightly downwardly from its central portion toward its ends and to thus coöperate with its guide 28. As the top guides and grooves of each axle-box are curved in a similar manner, they tend to cause the axle-boxes to return to their normal and central position when the truck is passing from off a curve.

The brakework is supported from the outer end of each frame 19, the brake-blocks 32 being carried by links 33, that are attached to arms 34 on the frame. The brake-blocks 32 of each pair of wheels are also connected together by means of a transverse bar 35, that is connected by two links 36 to two depending arms 37 of a second transverse shaft 38, mounted at the inner part of the frame. This second transverse shaft 38 has a third depending arm 39, that is connected by a link 40 to one arm of a lever 41, that is carried by the lower end of the shaft 8. The arrangement is such that when the shaft 8 is turned by operation of the brake-handle motion is communicated to the transverse shaft 38, which is partly turned on its axis in such wise that the links 36 are caused to pull on the transverse bar 35, and so bring the blocks 32 into contact with the wheels. The brake-blocks 32 are normally held in the off position by means of springs 42, that are connected to the firstly-mentioned transverse bar 35.

It will be understood that with the arrangement above described the wheels are able to take any curve and that the brake-gear, being carried by the frame, in which the wheels are also arranged, will take part with such frame in its movements and will always be in perfect alinement and in a position ready to act on the wheels, and there will be no need to provide compensating gear, such as is necessary when the brake-gear is carried by the truck itself. Also the brakes with the present arrangement are more efficient, and it is not necessary to provide blocks on either side of each wheel, as is sometimes now the case.

What I claim is—

1. In a four-wheel radial truck, the combination with the truck proper, of axles movable endwise in axle-boxes in said truck proper, frames, partly supporting the motors, mounted on said axles and pivoted to the truck proper at a point between the axles and central portion of the truck, as set forth.

2. In a four-wheel radial truck, the combination with the truck proper, of axles radially movable in axle-boxes in said truck proper, frames, partly supporting the motors, mounted on said axles and pivoted to the truck proper at a point between the axles and central portion of the truck, as set forth.

3. In a four-wheel radial truck, the combination with the truck proper and axles mounted therein, of frames mounted on said axle and pivoted to the truck proper at a point between the axles and central portion of the truck, and brake-gear carried by said frames wholly independent of the truck, as set forth.

4. In a four-wheel radial truck, the combination with the truck proper, of axles radially movable in said truck, frames mounted on said axles and pivoted to the truck proper at a point between the axles and central portion of the truck and brake-gear carried by said frames wholly independent of the truck as set forth.

5. A four-wheel radial truck comprising upper and lower longitudinal side members, springs supporting said members, axles mounted in the lower of said members, and frames, partly supporting the motors, mounted on said axles and pivoted to the truck at a point between the axles and central portion of the truck, as set forth.

6. A four-wheel radial truck comprising upper and lower longitudinal side members, springs supporting said members, axles movable radially, mounted in the lower of said members, and frames, partly supporting the motors, mounted on said axles and pivoted to the truck proper at a point between the axles and central portion thereof, as set forth.

7. A four-wheel radial truck comprising upper and lower longitudinal side members, springs supporting said members, axles mounted in the lower of said members, frames, partly supporting the motors, mounted on said axles and pivoted to the truck at a point between the axles and central portion of the truck and brake-gear carried by said frames wholly independent of the truck, as set forth.

8. A four-wheel radial truck comprising upper and lower longitudinal side members, springs supporting said members, axles movable radially, mounted in the lower of said members, frames, partly supporting the motors, mounted on said axles and pivoted to the truck proper at a point between the axles and central portion thereof, and brake-gear carried by said frames wholly independent of the truck, as set forth.

9. A four-wheel radial truck comprising upper and lower longitudinal side members, springs interposed between said members, axles mounted in axle-boxes movable vertically in guides in said lower members, springs interposed between said axle-boxes and lower members, and a frame mounted on each of said axles, each frame partly supporting a motor and being pivoted at its inner side to the truck at a point between its axle and the central portion of the truck, as set forth.

10. A four-wheel radial truck comprising upper and lower longitudinal side members, springs interposed between said members, axles movable radially mounted in axle-boxes movable vertically in guides in said lower members, springs interposed between said axle-boxes and lower members, and a frame mounted on each of said axles, each frame partly supporting a motor and being pivoted at its inner side to the truck at a point between its axle and the central portion of the truck, as set forth.

11. A four-wheel radial truck comprising upper and lower longitudinal side members, springs interposed between said members, axles mounted in axle-boxes movable vertically in guides in said lower members, springs interposed between said axle-boxes and lower members, a frame mounted on each of said axles, each frame partly supporting a motor and being pivoted at its inner side to the truck at a point between its axle and the central portion of the truck, and brake-gear carried by each of said frames wholly independent of the truck, as set forth.

12. A four-wheel radial truck comprising upper and lower longitudinal side members, springs interposed between said members, axles movable radially mounted in axle-boxes movable vertically in guides in said lower members, springs interposed between said axle-boxes and lower members, a frame mounted on each of said axles, each frame partly supporting a motor and being pivoted at its inner side to the truck at a point between its axle and the central portion of the truck, and brake-gear carried by each of said frames wholly independent of the truck, as set forth.

13. A four-wheel radial truck comprising upper and lower longitudinal side members, springs supporting said members, transverse centrally-arranged members connecting said lower members together, axles mounted in the lower of said members, and frames partly supporting the motors, mounted on said axles and pivoted to said transverse centrally-arranged members, as set forth.

14. A four-wheel radial truck comprising upper and lower longitudinal side members, springs supporting said members, transverse centrally-arranged members connecting said lower members together, axles movable radially mounted in the lower of said members, and frames partly supporting the motors, mounted on said axles and pivoted to said transverse centrally-arranged members, as set forth.

15. A four-wheel radial truck comprising upper and lower longitudinal side members, springs supporting said members, transverse centrally-arranged members connecting said lower members together, axles mounted in the lower of said members, frames partly supporting the motors, mounted on said axles and pivoted to said transverse centrally-arranged members, and brake-gear carried by said frames wholly independent of the truck, as set forth.

16. A four-wheel radial truck comprising upper and lower longitudinal side members, springs supporting said members, transverse centrally-arranged members connecting said lower members together, axles movable radially mounted in the lower of said members, frames partly supporting the motors, mounted on said axles and pivoted to said transverse centrally-arranged members, and brake-gear carried by said frames wholly independent of the truck, as set forth.

17. A four-wheel radial truck comprising upper and lower longitudinal side members, springs interposed between said members, transverse centrally-arranged members connecting said lower members together, axles mounted in axle-boxes movable vertically in guides in said lower members, springs interposed between said axle-boxes and lower members, and a frame mounted on each of said axles, each frame partly supporting a motor and being pivoted at its side to said transverse centrally-arranged members, as set forth.

18. A four-wheel radial truck comprising upper and lower longitudinal side members, springs interposed between said members, transverse centrally-arranged members connecting said lower members together, axles movable radially mounted in axle-boxes movable vertically in guides in said lower members, springs interposed between said axle-boxes and lower members, and a frame mounted on each of said axles, each frame partly supporting a motor and being pivoted at its side to said transverse centrally-arranged members, as set forth.

19. A four-wheel radial truck comprising upper and lower longitudinal side members, springs interposed between said members, transverse centrally-arranged members connecting said lower members together, axles movable radially mounted in axle-boxes movable vertically in guides in said lower members, springs interposed between said axle-boxes and lower members, a frame mounted on each of said axles, each frame partly supporting a motor and being pivoted at its inner side to said transverse centrally-arranged members, and brake-gear carried by each of said frames wholly independent of the truck, as set forth.

20. A four-wheel radial truck comprising upper and lower longitudinal side members, springs interposed between said members, transverse centrally-arranged members connecting said lower members together, axles mounted in axle-boxes movable vertically in guides in said lower members, springs interposed between said axle-boxes and lower members, a frame mounted on each of said axles, each frame partly supporting a motor and being pivoted at its inner side to said transverse centrally-arranged members and brake-gear carried by each of said frames wholly independent of the truck.

Signed at Birmingham, England, this 15th day of October, 1904.

ELMER ELSWORTH COOK.

Witnesses:
E. HARKER,
MARSHAL HALSTEAD.